United States Patent [19]

Clary

[11] 3,905,115

[45] Sept. 16, 1975

[54] GAUGE FOR TUBULAR MEMBERS

[75] Inventor: Derwin R. Clary, Odessa, Tex.

[73] Assignee: Trip Inspectors, Inc., Odessa, Tex.

[22] Filed: Jan. 7, 1974

[21] Appl. No.: 431,125

[52] U.S. Cl............. 33/143 L; 33/147 L; 33/178 E
[51] Int. Cl. .............................................. G01b 5/10
[58] Field of Search........... 33/143 L, 178 E, 178 F, 33/148 H, 149 J, 174 L, 174 Q, 172 E, 147 L

[56] References Cited
UNITED STATES PATENTS
2,659,182  11/1953  Argyle.............................. 33/147 L FOREIGN PATENTS OR APPLICATIONS
510,873  3/1955  Canada............................. 33/147 L Primary Examiner—Richard E. Aegerter
Assistant Examiner—Willis Little
Attorney, Agent, or Firm—Jack W. Hayden

[57] ABSTRACT

Means are rotatably supported for rotation to engage the outer surface of a tubular member moving longitudinally therethrough. As the means is rotated and engages the outer surface of the tubular member moving therethrough, any deviations in the outer diameter of the tubular member is instrumentally noted as an indication of wear, damage, or any other anomaly in the outer surface of the tubular member.

Means are associated with the rotatable member so that it automatically adjusts for engaging various diameters of tubular members so that as they are moved longitudinally through the device any variations in the outer diameter of such tubular member may be instrumentally noted.

30 Claims, 3 Drawing Figures

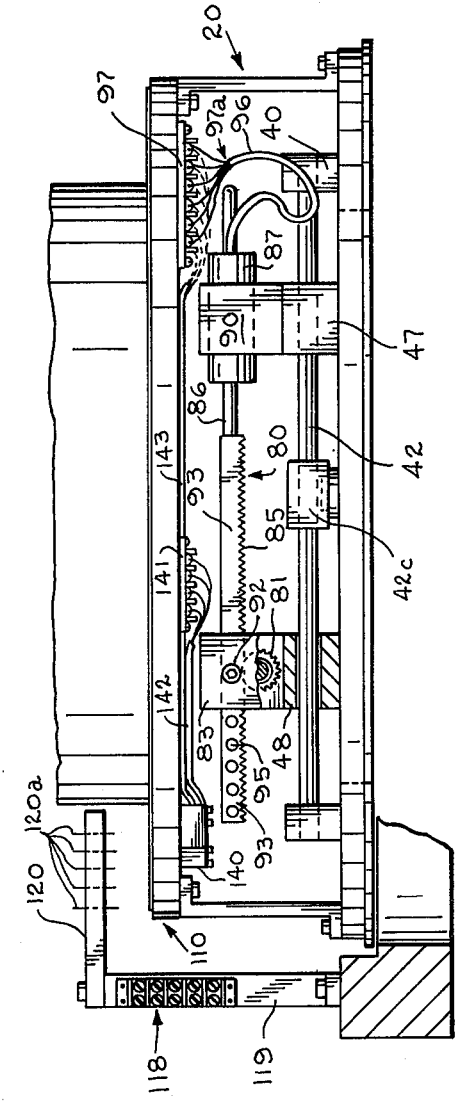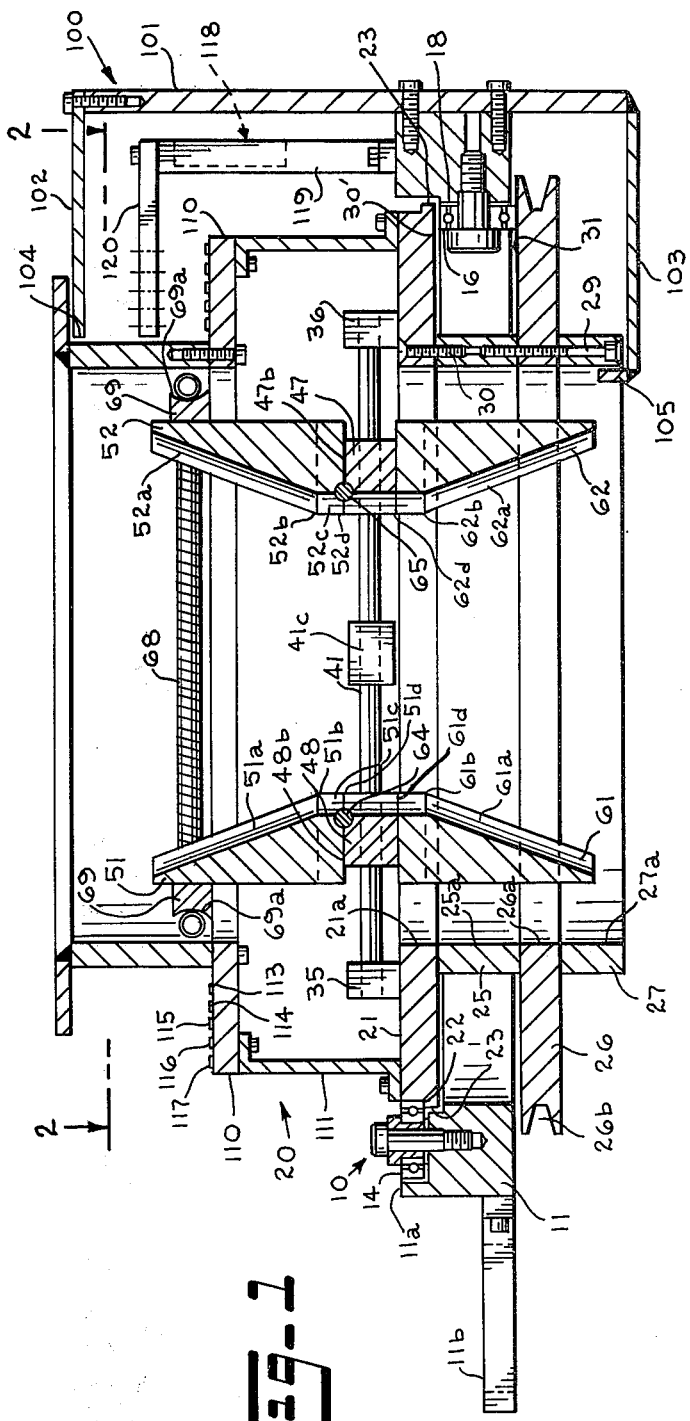

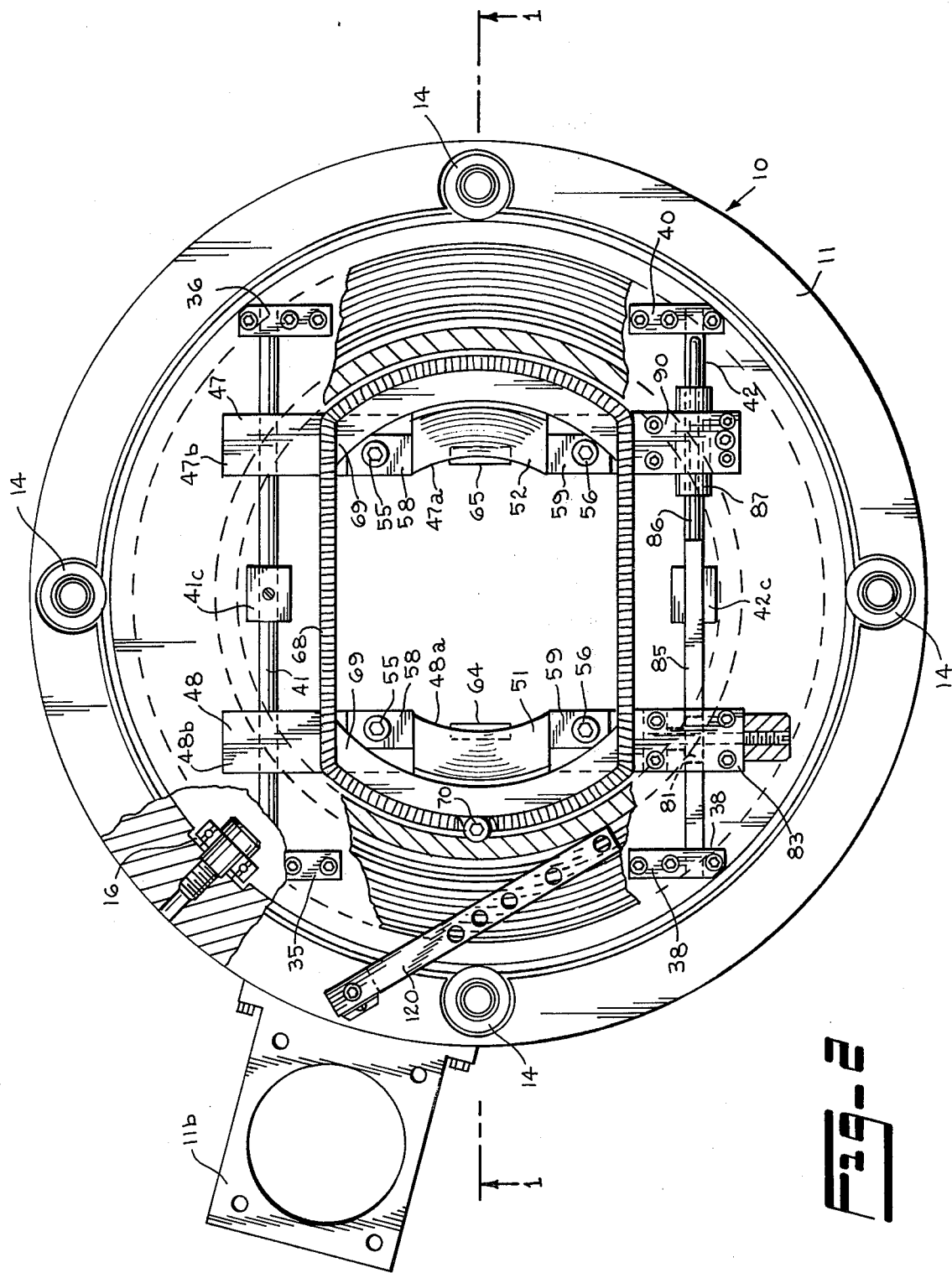

3,905,115

GAUGE FOR TUBULAR MEMBERS

DISCUSSION OF THE PRIOR ART

The patents with which applicant is familiar include Canadian Pat. Nos. 510,873 (Lister); Ege, 3,264,631; and Argyle, 3,659,182.

As tubular members, such as drill string and the like are lowered into or removed from wells, it is desirable to gauge the outer diameter of such tubular members to determine deviations therein. Any deviations may indicate a variation in thickness of the tubular members due to wear, damage or other anomalies in the tubular member, and may indicate when they should be replaced.

The present invention has particular application in connection with running tubular members, such as drill pipe, tubing and the like into or out of a well, such as an oil, gas well and the like.

Another object of the present invention is to provide a device for continuously determining any deviations in the outer diameter of a tubular member as it is moved longitudinally through the device including support means, means rotatably supported by said support means for rotatably engaging the outer surface of the tubular member as it is longitudinally moved therethrough and means associated with the rotatable means for indicating any deviations in the outer diameter of the tubular member as it is moved longitudinally through the rotatable member.

Yet a further object of the present invention is to provide rotatable means which include means for imparting rotation thereto so that it may rotatably engage the outer surface of a tubular member as it is moved longitudinally therethrough and means associated with the rotatable means for instrumentally indicating any deviations in the outer diameter of the tubular member as it is moved longitudinally through said rotatable member.

Yet a further object of the present invention is to provide rotatable means which include means for imparting rotation thereto so that it may rotatably engage the outer surface of a tubular member as it is moved longitudinally therethrough and means associated with the rotatable means for instrumentally indicating any deviations in the outer diameter of the tubular member as it is moved longitudinally through said rotatable member and wherein the rotatable means includes paired opposed surface means for contacting the outer surface of the tubular member, support means for each of said surface means to accommodate movement of said opposed surface means longitudinally of their respective support means in response to any lateral shifting of the tubular member moving through the device and means for determining relative linear motion of either said opposed surface means as an indication of deviation in the outer diameter of the tubular member.

Yet a further object of the present invention is to provide rotatable means which include means for imparting rotation thereto so that it may rotatably engage the outer surface of a tubular member as it is moved longitudinally therethrough and means associated with the rotatable means for instrumentally indicating any deviations in the outer diameter of the tubular member as it is moved longitudinally through said rotatable member and wherein the rotatable means includes paired opposed surface means for contacting the outer surface of the tubular member, support means for each of said surface means to accommodate movement of said opposed surface means longitudinally of their respective support means in response to any lateral shifting of the tubular member moving through the device and means for determining relative linear motion of either said opposed surface means as an indication of deviation in the outer diameter of the tubular member and including resilient means for urging the opposed surface means towards continuous engagement with the outer surface of the tubular member.

Another object of the present invention is to provide a rotatable member for rotatably engaging the outer surface of a tubular member as it is moved therethrough wherein such rotatable member includes paired opposed surface means for contacting the outer surface of the tubular member with support means for each of the surface means to accommodate transverse linear movement of the surface means in response to any lateral shifting of the tubular member moving through the device and means for instrumentally determining any relative linear motion of either of said opposed surface means as an indication of deviations in the outer diameter of the tubular member.

Another object of the present invention is to provide a rotatable member for rotatably engaging the outer surface of a tubular member as it is moved therethrough wherein such rotatable member includes paired opposed surface means for contacting the outer surface of the tubular member with support means for each of the surface means to accommodate transverse linear movement of the surface means in response to any lateral shifting of the tubular member moving through the device and means for instrumentally determining any relative linear motion of either of said opposed surface means as an indication of deviations in the outer diameter of the tubular member and means to adjust the instrument determining means whereby it is responsive to determine deviation in various diameter tubular members on which the device is employed.

Still another object of the present invention is to provide a method for determining any deviations in the outer diameter of a tubular member comprising the steps of rotatably engaging the outer diameter of the tubular member with a gauge as the tubular member is moved longitudinally therethrough and measuring any relative linear movement of the gauge as an indication of variations in the outer diameter of the tubular member.

Other objects and advantages of the present invention will become more readily apparent from a consideration of the following drawings and description.

BRIEF DESCRIPTION OF THE DRAWINGS

FIG. 1 is a sectional view on the line 1—1 of FIG. 2 showing the structural relationship of the components of the present invention;

FIG. 2 is a plan view of the device shown in FIG. 1; and

FIG. 3 is a partial sectional view illustrating further structural details of the invention.

DESCRIPTION OF THE PREFERRED EMBODIMENT

Attention is first directed to FIG. 1 of the drawings wherein a support means is referred to generally by the numeral 10. The support means is shown as including an annular ring 11 which is provided at circumferentially spaced positions with bearing means 14 adjacent the upper end or edge 11a as better illustrated in FIG. 2 of the drawings. Additional bearing means 16 are provided at a plurality of circumferentially spaced positions on the inner circumferential edge 18 of the ring 11 which, along with the bearing means 14 provide a means for rotatably supporting the rotatable means referred to generally at 20.

The rotatable means 20 includes an annular upper plate 21 which is provided with an annular shoulder 22 on the edge 23 thereof for engaging with the bearings 14. The upper annular plate is spaced from the lower plate or member 26 by suitable means such as the spacer 25 as shown in FIG. 1 of the drawings and the annular plate 21, the spacer 25, the lower plate or member 26, and the depending skirt 27 may all be secured together by any suitable means such as the bolts 29 and 30 to form a unitary structure supported by and rotatable in ring 11 for engaging the outer surface of a tubular member moved longitudinally therethrough, as will be described in greater detail.

It will be noted that the spaced circumferential bearing means 16 are adapted to engage the under surface 30' and the upper surface 31 of the annular plates or members 21 and 26 respectively to aid in properly positioning the rotatable means 20 within the support means 10 for rotation.

It will also be noted that the upper annular plate or member plate 21, the spacer 25, the lower plate or member 26 as well as the depending skirt 27 are each provided with an annular opening 21a, 25a, 26a, and 27a respectively for accommodating passage of a tubular member through the device as will be described in greater detail. Also, the annular ring 11 is shown as including a tongue 11b whereby the device may be secured in position for use as will be described in greater detail hereinafter.

The upper annular plate 21 is provided with brackets 35 and 36 which are arranged in opposed relationship at one side of the plate 21 as better shown in FIG. 2 of the drawings and are also provided with brackets 38 and 40 in opposed relationship on the other side of plate 21 as better illustrated in FIG. 2 of the drawings. A bar or rod 41 extends between the brackets 35 and 36 and a similar bar 42 extends between the brackets 38 and 40, each rod 41 and 42 being respectively secured in position by the brackets 35, 36, 38 and 40. The brackets 35, 36, 38 and 40 may be secured in position by screws or the like as shown.

Slidably mounted in opposed relationship on each of the rods 41 and 42 are the first and second members 47 and 48. It will be noted that the member 47 is slidably carried by each of the rods 41 and 42, while the member 48, is similarly slidably mounted on and carried by the rods 41 and 42. The central portion 47a and 48a of each of the members 47 and 48 is provided with an arcuate surface for generally conforming with the outer surface of the tubular member to be received therebetween and moved longitudinally through the rotatable member 20 for measuring any deviations in the outer diameter of such tubular member as will be described.

Secured to the upper edge 47b and the upper edge 48b of the members 47 and 48 are longitudinally curved and outwardly flaring guides 51 and 52. The guide 51 includes the generally arcuate surface 51a extending generally longitudinally of the guide 51 and it will be noted that the surface 51a is inclined outwardly away from its lower innermost edge 51b as shown in FIG. 1. The longitudinally and vertically extending, arcuate portion 51c extends from the edge 51b downwardly to the edge or end 52d of the guide 52. Member 48 is provided with a surface in the central portion thereof conforming with surface 51c as shown in FIGS. 1 and 2 of the drawings. Guide 61 also includes a surface conforming with surface 51c which extends from the edge 61b of sloping surface 61a to the end 61d of guide 62 where it abuts the other side of member 48. Similarly the guide 52 is provided with a sloping surface 52a conforming generally with the surface 51a and is flared outwardly away from its lowermost portion 52b, and is also provided with a longitudinal, vertically extending arcuate surface 52c that extends from the lower innermost edge 52b of the inclined surface 52a downwardly to the edge or end 52d of the guide 52.

Member 47 is provided with an arcuate vertical surface in the central portion thereof conforming with 52c, and guide 62 is also provided with a surface conforming to 52c which extends from the end 62b of sloping surface 62a to the end 62d of guide 62 adjacent member 47.

Guides 51, 52, 61 and 62 may be positioned on the arms 48 and 47 in any suitable manner such as by means of the Allen screws 55 and 56 engaging the laterally extending projections 58 and 59 integrally formed with the guides 51 and 52, as shown in FIG. 2.

The guides 61 and 62 which are provided on the opposite side of the members 47 and 48 assist in properly guiding tubular members through the rotatable member 21 regardless in which direction they may be moved. In other words, the tubular member may be moved in either direction through the rotatable member 20 in order to gauge the outer diameter of such tubular member and determine any deviation in such outer diameter.

A hardened surface is provided for engaging the outer surface of the tubular members moving between the members 47 and 48, such hardened surface being in the form of cylindrical carbides 64 and 65 which are shown as being positioned within the arcuate vertical surfaces 51c, 52c between the ends of guides 51 and 52 and the members 48 and 47 respectively so that they may be replaced from time to time merely by removing the guides after the carbides have become worn.

Resilient means in the form of a spring 68 is carried by a pair of brackets 69, one bracket 69 being mounted on each of the guides 51 and 52 as shown in FIGS. 1 and 2 and being of generally arcuate configuration in a horizontal plane and having an arcuate recess 69a for receiving the spring 68 therein. The ends of the spring may be secured together by any suitable means such as a fastener 70 or the like. The resilient means 68 tends to urge the members 47 and 48 and guides 51, 52, 61 and 62 supported thereon longitudinally of the rods 41 and 42 and towards each other so as to continuously urge surfaces 64 and 65 into contact with the outer surface of the tubular member moved therebetween.

Since the members 47 and 48 are slidably mounted on the rods 41 and 42, any lateral shifting of the tubular member as it moves between the surfaces 64 and 65 will be accommodated without any deleterious effect. It can be appreciated that when the device is employed as a tubular member is lowered into or removed from a well bore, some lateral movement of the tubular member may occur which will shift the members 47 and 48 laterally of the rotatable means 20 but such shifting will not affect the operation of the device as the surfaces 64 and 65 will remain in contact with the outer surface of the tubular member. To limit shifting of the gauge formed by guides 51, 52, 61 and 62, stop means 41c and 42c are fixed in the middle of rods 41, 42 as shown in FIG. 2.

In order to determine, measure or indicate any variations in the outer diameter of the tubular member as it moves through the device, suitable means referred to generally at 80 are provided. Such means as illustrated includes a pinion 81 rotatably carried in bracket 83 mounted on member 48. Engaged therewith is a gear rack 85 which has a rod 86 projecting therefrom and telescopically extending into a variable linear displacement transformer referred to generally at 87. The transformer 87 is mounted in the bracket 90 that is in turn mounted on and travels with the member 47 as shown in FIGS. 2 and 3.

It can be appreciated that any movement of either the member 47 or the member 48 due to any deviations in the outer diameter of the tubular member as the rotatable member 20 is rotated and as the tubular member is moved longitudinally through the device causes the gear rack 85 or the transformer 87 to move which in turn causes the rod 86 extending into the linear variable displacement transformer to change its longitudinal position in the transformer 87 and this change yields an electronic indication as to such movement.

It can be appreciated that the rod 86 is employed as a core of the transformer, and it is necessary to "null" or "zero" the transformer for each diameter tubular member with which the present invention is employed. This is accomplished by positioning the rod 86 so that it is centered relative to the transformer to "zero" or "null" the transformer for a particular diameter tubular member which is to be run through the present device for determination of any deviations in the outer diameter thereof. After the rod 86 has been so positioned, the Allen screw 92 is secured in a detent or depression 95 formed in the surface 93 of the gear rack 85 to lock the gear rack 85 to the pinion 81. Similarly, a plurality of other spaced depressions as shown at 95 are provided for positioning the rod 86 relative to the transformer 87 for each diameter of tubular member on which the present invention is to be employed.

If desired, the entire apparatus can be encased in a partial housing generally referred to at 100 and including the partial outer circular member 101 secured as shown to ring 11. The member 101 is provided with the annular top cover plate 102 and bottom cover plate 103 which of course are provided with openings 104 and 105 respectively for receiving the tubular member.

In addition, a circular plate 110 is carried by the circumferentially spaced vertically extending brackets 111 that are in turn secured on the upper plate 21 as shown in FIG. 1. The plate 110 is provided with a plurality of continuous, circular metallic strips 113, 114, 115, 116 and 117 as shown which function as means for conveying power to the transformer 87 and for relaying electric pulses from the transformer 87 as an indication of variations in the outer diameter of the tubular members moving through the apparatus.

More specifically, it will be noted that the strips 113–117 inclusive are spaced circumferentially relative to each other and extend continuously circumferentially of the plate 110 to thereby provide commutator means so that power from a suitable electrical source (not shown) may be supplied to the panel 118 carried on arm 119 mounted on ring 11, and so that signals may be relayed from the transformer 87.

Panel 118 is connected by electric conduits (not shown) in 119 and 120 to brushes represented at 120a in dotted line in FIG. 3. Power from the panel 118 is conducted through electrical conduits in 119 and 120 to two brushes 120a, and the bushes 120a in turn contact two of the continuous strips, such as circular metal strips such as 113, 114 on the plate 110. The arm 120 extends outwardly over the plate 110 and the strips thereon as shown in FIG. 3, and the plurality of brush means 120a depend from the arm 120 and engage the respective strips 113, 114 to continuously supply power when the device is in operation.

Suitable means of a well known construction is represented at 140 and is mounted on the opposite side of plate 110 as shown in FIG. 3. Means 140 functions as a voltage regulator to supply a constant voltage to transformer 87, and it is electrically connected through plate 110 to each of the strips 113–117, and it is electrically connected to panel 141 by conduit 142, and panel 141 is connected to panel 97 by conduit 143.

Similarly, electric impulses imparted by relative movement of the member 47 to the member 48 or relative movement of the member 48 to the member 47 creates an electric current which is transmitted through conduit 96 to the relay panel 97 and the relay panel 97 has at least three leads such as by way of example any one of the three electrical conduits of the group referred to at 97a. These are connected through conduit 143, panel 141, conduit 142 to means 140, as previously noted is electrically connected through plate 110 to strips 115–117 and brushes 120a engaged therewith. Thus, impulses from transformer 87 are conducted to panel 118 and may then be used to operate a stylus or other instrument for indicating any variations in the diameter of the tubular member as it moves between and through 47 and 48.

It can be appreciated that any type of transducer that measures linear motion could be used in lieu of the linear displacement transformer 87; however, the arrangement as described has been found entirely satisfactory.

DESCRIPTION OF OPERATION

While it is believed that the operation of the present invention is apparent by reason of the foregoing, it will be assumed that the present invention is to be used at a well location as a tubular member is lowered thereinto. It can be appreciated that successive lengths of tubular members are connected together at their ends, to form a tubular string such as drill string, tubing casing or the like, and is lowered downwardly between the guides 51 and 52.

As the tubular member is lowered downwardly to engage the surfaces 64 and 65 rotations is imparted to the tubular member 20. Rotation may be imparted in any suitable manner, and as shown, the lower plate 26 is provided with a groove 26b so that a pulley may be connected therearound and with a prime mover of any suitable type to impart rotation to the rotatable member 20. The rotatable member 20 is rotated at a suitable speed say, for example only, at 100 revolutions per minute so that the outer surface of the tubular member is contacted throughout its longitudinal extent and throughout its circumferential extent as it is moved between the wear resistant surfaces 64 and 65.

Since the transformer 87 and the core 86 thereof have been positioned relative to each other prior to initially moving the tubular member through the device so that the transformer will be at "zero" or "null" position for the normal outer diameter of the tubular member, any deviations in the outer diameter of the tubular member will cause either the member 47 or the member 48 to shift linearly along rods 41, 42. When this occurs, movement of the gear rack 85 and the rod 86 is effected since it is geared to the pinion 81, or movement of the transformer 87 relative to its core 86 is effected should the member 47 move linearly relative to the member 48.

The impulses from transformer 87 are relayed through 97, 143, 141, 142, and 140 through 110 to the respective commutator rings on 110 and then brushes 120a engaged therewith which correspond with the electrical conduits that pick up the impulses from transformer 87. The impulses are then conveyed through electrical conduits in arms 120, 119 to panel 118, where they may then be employed to operate any suitable instrument or recording device.

It is also to be noted that the rotatable means 20 is supported by bearing means 14 in a horizontal plane and bearing means 16 in a vertical plane.

It can be seen that the device of the present invention can be mounted in any suitable manner at a well head location, or it may be moved by suitable motor means along tubular members to measure variations in the diameter of the engaged tubular members.

It can also be used for quality control at mills as well as in the field.

Where a stylus is driven by the transformer 87, such stylus may be engaged with suitable paper or other material and the paper moved in relation to movement of tubular members through the device. Such movement is continuously noted and recorded by the stylus and any variations in the O. D. of the tubular member cause the stylus to deviate or move from its normal path. The stylus movement may be in proportion to the amount of deviation being measured.

The foregoing disclosure and description of the invention are illustrative and explanatory thereof, and various changes in the size, shape, and materials as well as in the details of the illustrated construction may be made without departing from the spirit of the invention.

What is claimed is:

1. A device for determining any deviations in the outer diameter of a tubular member as it is moved longitudinally through the device comprising:
   a. support means having a central opening therethrough;
   b. means rotatably supported by said support means and co-axially arranged with respect to the central opening, said rotatable means including radially displaceable means for rotatably engaging the tubular member as it is longitudinally moved therethrough; and
   c. means associated with said rotatable means for indicating any deviations in the outer diameter of the tubular member as it is moved longitudinally through said rotatable means while said rotatable means rotates around the tubular member.

2. The invention of claim 1 including means for imparting rotation to said rotatable member.

3. The invention of claim 1 wherein said rotatable means includes:
   a. paired opposed surface means for contacting the outer surface of the tubular member;
   b. supporting means for each of said surface means to accommodate linear movement of said opposed surface means longitudinally of their respective supporting means in response to any lateral shifting of the tubular member through the device; and
   c. means for determining relative linear motion of either of said opposed surface means as an indication of deviation in the outer diameter of the tubular member.

4. The invention of claim 3 including resilient means for urging said opposed surface means towards continuous engagement with the outer surface of the tubular member.

5. The invention of claim 4 including guide means carried by said rotatable means for guiding the tubular member between said opposed surface means.

6. The invention of claim 5 wherein said guide means extends from said rotatable member longitudinally in both directions whereby the tubular member may be inserted into the device from either end.

7. The invention of claim 3 wherein said means for determining relative linear motion includes:
   a. a variable linear displacement transformer on said surface support means;
   b. pinion means mounted on said surface support means;
   c. gear rack means engaged with said pinion means and including an end portion telescopically extending into said transformer;
   d. means for supplying power to said transformer;
   e. means for transmitting signals from said transformer as an indication of relative movement between said transformer and gear rack means.

8. The invention of claim 7 wherein said power supply means includes:
   a. commutator means supported on said rotatably supported means;
   b. brush means carried by said support means and engaged with said commutator means; and
   c. means for electrically conducting to said brush means.

9. The invention of claim 7 wherein said signal transmitting means includes:
   a. commutator means supported on said rotatably supported means;
   b. brush means carried by said support means and engaged with said commutator means; and
   c. means for electrically transmitting signals from said transformer to said commutator and brush means.

10. The invention of claim 9 including means for instrumentally noting the signals transmitted from said transformer.

11. The invention of claim 9 including means for continuously recording signals from said transformer, including:
    a. stylus means; and
    b. means for recording movement of said stylus means.

12. A device for continuously determining any deviations in the outer diameter of a tubular member as it is moved longitudinally through the device comprising:
   a. support means;
   b. means rotatably supported by said support means for rotatably engaging the tubular member as it is longitudinally moved therethrough; and
   c. said rotatable means including:
      1. an annular member having an opening therein;
      2. bearing means supporting said annular member;
      3. a first pair of bracket means mounted on said annular member at one side thereof;
      4. a second pair of bracket means mounted on said annular member at the other side thereof;
      5. first and second rod means secured in and extending between each of said pair of bracket means;
      6. first and second members extending transversely between and slidable on said first and second rod means;
      7. guide means mounted on each said first and second members for receiving tubular members therebetween;
      8. resilient means engaging said guide means for urging said guide means and said first and second members toward each other;
      9. there being surface means associated with said guide means for engaging tubular members as they are moved longitudinally therebetween;
   d. means for rotating said rotatable support means to engage said surface means with the circumferential and longitudinal extent of the tubular member as it is moved between said surface means; and
   e. means associated with said rotatable means for indicating deviations in the outer diameter of the tubular member as it is moved between said surface means.

13. The invention of claim 12 wherein said deviation indicating means includes means for detecting relative movement between said first and second members.

14. The invention of claim 13 wherein said detecting means includes:
   a. a variable linear displacement transformer carried by said first member;
   b. pinion means mounted on said second member and having gear rack means engaged therewith which has one end telescopically received in said transformer;
   c. means for supplying power to said transformer; and
   d. means for transmitting signals from said transformer as an indication of relative movement between said transformer and gear rack means.

15. The invention of claim 7 including means to zero said transformer and telescoped gear rack end for each diameter of tubular member.

16. The invention of claim 14 including means to zero said transformer and telescoped gear rack end for each diameter of tubular member.

17. The invention of claim 14 wherein said power supply means includes:
   a. commutator means supported on said rotatably supported means;
   b. brush means carried by said support means and engaged with said commutator means; and
   c. means for electrically conducting to said brush means.

18. The invention of claim 14 wherein said signal transmitting means includes:
   a. commutator means supported on said rotatably supported means;
   b. brush means carried by said support means and engaged with said commutator means; and
   c. means for electrically transmitting signals from said transformer to said commutator and brush means.

19. The invention of claim 18 including means for instrumentally noting the signals transmitted from said transformer.

20. The invention of claim 18 including means for continuously recording signals from said transformer, including:
   a. stylus means; and
   b. means for recording movement of said stylus means.

21. A method of measuring variations in the outer diameter of a tubular member comprising:
   a. engaging a gauge with the outer surface of the tubular member;
   b. moving the tubular member longitudinally of the gauge while simultaneously rotating the gauge circumferentially about the tubular member; and
   c. instrumentally sensing any variations in the outer surface of the tubular member as an indication of variations in the outer diameter of the tubular member.

22. The method of claim 21 including the step of instrumentally recording the variations of the outer diameter of the tubular member.

23. The method of claim 21, wherein said step of instrumentally sensing any variations in the outer surface of the tubular member includes the further step of translating radial displacements of the gauge into instrumental indications of deviations of the outer diameter of the tubular member.

24. The device of claim 1 wherein said means associated with said rotatable means for indicating any deviations in the outer diameter of the tubular member includes means connected with said radially displaceable means for translating displacements of said radially displaceable means into instrumental indications of deviations in the outer diameter of the tubular member.

25. A device for testing a member having a cylindrical surface as it is moved longitudinally relative to the device comprising:
   a. means rotatable about the member, said rotatable means having an opening therethrough which is arranged co-axially with respect to the member;
   b. said rotatable means including means for rotatably engaging the member, said engaging means being radially displaceable in response to deviations in the outer diameter of the member; and
   c. means associated with said rotatable means for indicating any deviations in the outer diameter of the member as it is moved longitudinally through said rotatable means while said engaging means rotates around the member.

26. The invention of claim 25 including a support means, said rotatably means being rotatably supported by said support means.

27. The device of claim 25, wherein said means associated with said rotatable means for indicating any deviations in the outer diameter of the member includes means connected with and radially displaceable means for translating displacements of said radially displaceable means into instrumental indications of deviations in the outer diameter of the member.

28. A device for testing a member having a cylindrical surface as it is moved longitudinally relative to the device comprising:
   a. a member to be tested, said member being elongated and having at least one cylindrical surface;
   b. means rotatable about said member, said rotatable means having an opening therethrough which is arranged co-axially with respect to the longitudinal axis of said member;
   c. said rotatable means including means for rotatably engaging said member, said engaging means being radially displaceable in response to deviations in the outer diameter of said member;
   d. means associated with said rotatable means for indicating any deviations in the outer diameter of the member as it is moved longitudinally through said rotatable means while said engaging means rotates around said member.

29. The invention of claim 28 including a support means, said rotatable means being rotatably supported by said support means.

30. The device of claim 28 wherein said means associated with said rotatable means for indicating any deviations in the outer diameter of the member includes means connected with said radially displaceable means for translating displacements of said radially displaceable means into instrumental indications of deviations in the outer diameter of the member.

* * * * *